Figure 1:
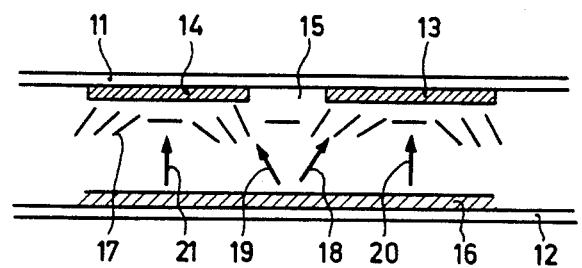

United States Patent [19]

Goscianski

[11] Patent Number: 4,496,220

[45] Date of Patent: Jan. 29, 1985

[54] INFORMATION DISPLAY DEVICE COMPRISING A LIQUID CRYSTAL CELL

[75] Inventor: Michel Goscianski, Limeil-Brevannes, France

[73] Assignee: U.S. Philips Corporation, New York, N.Y.

[21] Appl. No.: 885,302

[22] Filed: Mar. 10, 1978

[30] Foreign Application Priority Data

Mar. 21, 1977 [FR] France ............... 77 08403

[51] Int. Cl.³ ............................. G02F 1/13
[52] U.S. Cl. ........................... 350/341; 350/340
[58] Field of Search ............................. 350/340, 341

[56] References Cited

U.S. PATENT DOCUMENTS

| 4,002,404 | 1/1977 | Dir ................. | 350/341 X |
| 4,066,337 | 1/1978 | Kobale et al. ....... | 350/341 |
| 4,128,313 | 12/1978 | Cole et al. ........ | 350/341 X |
| 4,150,877 | 4/1979 | Kobale et al. ....... | 350/341 |

OTHER PUBLICATIONS

Janning, J. L., "Thin Film Surface Orientation for Liquid Crystals," *Applied Phys. Lett.*, vol. 21, No. 4, (Aug. 15, 1972), pp. 173-174.

*Primary Examiner*—John K. Corbin
*Assistant Examiner*—Richard F. Gallivan
*Attorney, Agent, or Firm*—Paul R. Miller

[57] ABSTRACT

Each side of a liquid crystal cell having a neumatic liquid crystal is provided with electrodes which are formed by conductive parallel strips separated by insulating strips. The direction of orientation of the axes of the molecules of the liquid crystal which are in contact with the electrodes are not uniform and differ opposite to the conductive strips or the insulating strips. When an electric field is applied between oppositely located electrodes, all molecules which are in contact with the same electrode flip-over in the same direction, namely that direction which is induced by the oblique position of the axes of the molecules opposite to the insulating strips relative to the axes of the molecules opposite to the conductive strips. This avoids optical discontinuities which occur generally in the absence of the inclination.

11 Claims, 2 Drawing Figures

INFORMATION DISPLAY DEVICE COMPRISING A LIQUID CRYSTAL CELL

The invention relates to a display device having a layer of nematic liquid crystal between two sets of electrodes, in which the molecules in the proximity of the plane of the electrodes have a preferred orientation in parallel planes perpendicular to the plane of the electrodes, which orientation can be altered under the influence of an electric field. Such a device may be used, for example, for displaying information in lines and columns, each electrode being formed by conductive strips which are separated from each other by insulating strips (intermediate spaces).

The invention also relates to a method of realising a preferred orientation of the molecules.

It is known that in the manufacture of a liquid crystal cell the problem presents itself of aligning the molecule axes in proximity to the electrodes. According to the prior art, one of the methods (see, for example, the articles by J. L. Janning in "Applied Physics Letters", volume 21, page 173, 1972 and E. Guyon, P. Pieranski and M. Boix in "Letters Applied Sciences and Engineering", volume 1, p. 19, 1973) comprises the vapor deposition on each electrode of a thin layer of silicon oxide (SiO) in a thickness of a few tens of Ångströms according to an oblique direction of incidence. The direction of orientation of the axes of the molecules of the liquid crystal in proximity to the electrode becomes dependent on the vapor deposition direction, that is the direction of the plane of the substrate supporting the electrode with respect to the direction in which the vapor deposition is carried out. When the angle $\alpha$ formed by this direction and the normal to the substrate has a value between 45° and 80°, the molecular axes align parallel to the substrate according to the direction which is at right angles to the plane determined by the normal and the direction of vapor deposition, hereinafter referred to as plane of deposition. On the contrary, when deposition occurs according to a direction which is substantially parallel to the substrate, that is to say when $\alpha$ is (much) larger than 80°, the molecular axes align parallel to the plane of deposition with an angle with respect to the plane of the substrate which may vary from a few degrees to a few tens of degrees.

In the case of a device for displaying information in lines and columns, the preferred orientation induced by the SiO layer vapor deposited at an angle of 70° is very satisfactory as long as the cell is not subjected to any electric voltage. If, however, an electric voltage in the zones being excitated flips-over the molecules in an opposite direction, two zones are formed in which the directions of flipping-over are opposite. In fact, in proximity of two adjacent edges of an electrode, the electric fields are mirror-symmetrical so that movements of flipping-over are also mirror-symmetrical and regions of opposite directions of flipping-over are formed. On the boundary line between such regions an optical discontinuity is present which adversely influences the display.

It is the object of the present invention to avoid such optical discontinuities.

According to this invention, a picture display device of the kind mentioned in the first paragraph is characterized in that the angle of preferred orientation with respect to the plane of the electrodes approximate to the electrodes differs from the angle of orientation in proximity to intermediate spaces between the electrodes, which difference is from a few degrees to a few tens of degrees.

The direction of the preferred orientation depends upon the type of liquid crystal used. This direction is chosen to be perpendicular to the conductive electrode strips in the case of a liquid crystal having a homeotropic configuration, and is chosen to be parallel to these strips in the case of a liquid crystal having a planar configuration or a nematic helical configuration.

The invention also provides a method for obtaining such a structure. The method which will hereinafter be described in detail consists of surface treatment of each electrode and the substrate so as to favourably influence such an orientation of the molecules. The surface treatment proposed by the invention is a combination of treatments according to the prior art. Namely, vapor depositions are carried out in the directions of each electrode and the substrate and comprise two successive phases of depositions in which a different angle of incidence is used for each phase.

Figure 2:
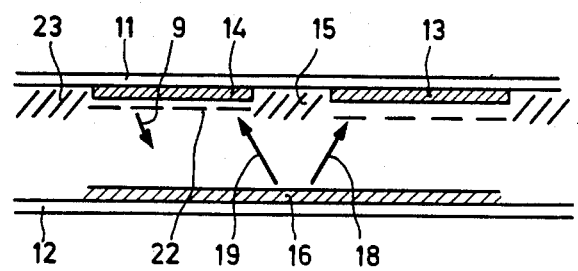

The invention will now be described in greater detail with reference to the drawing, in which:

FIG. 1 is a partial sectional view perpendicular to the sides of a known liquid crystal cell with the figure also showing clearly flipping-over movements of the molecules occurring in the opposite directions at the interface between the electrodes during the supply of a signal to the cell, and FIG 2. is a partial sectional view perpendicular to the planes of a liquid crystal cell according to the present invention with the figure also showing clearly the direction of orientation of the molecules in the boundary layers of the electrodes during absence of electrical excitation.

In FIG. 1 the substrates of each electrode are denoted by 11 and 12. One of the electrodes which is provided on the substrate 11 is formed by conductive parallel strips which extend, for example, perpendicular to the plane of the drawing. Two such strips are denoted by 13 and 14. The insulating strip or area 15 is situated between the strips 13 and 14. Another electrode 16 which is situated on the substrate 12 is formed, for example, by conductive strips extending parallel to the plane of the drawing. One of said strips" to drawing or perpendicular to conductive strips 13 and 14. One such strip is denoted by 16. Each line, for example line 17, denotes the axis of a molecule of the liquid crystal at the level of the conductive and intermediate strips 13, 14, 15. According to the prior art, such strips were subjected to a treatment to make the axes of the molecules, for example, parallel to the substrate 11, and situated in the plane of the drawing in the absence of an electrical signal between the conductive strips 13, 14 and 16. A voltage between such conductive strips 13, 14 and 16 produces an electric field. As a result of the presence of the insulating strip 15, the electric field at the level of the strip 15 and on either side of the median plane of the strip 15, is oriented in the direction of the arrows 18 and 19 symmetrical relative to the median plane, while in the center of the conductive strips 14 and 13 the field is oriented in the direction of the arrows 20 and 21 perpendicular to the substrates 11 and 12. This has for its result that under the influence of the field the axes of the molecules of the liquid crystal of positive dielectric anisotropy are flipped over in the manner as shown by the positions in FIG. 1 by the strips 17 with the flipping-over movements occurring in the opposite directions. It is known that this occurrence gives rise to optical discontinuities in the liquid crystals.

In FIG. 2 components of the cell according to the invention correspond to components of the cell shown in FIG. 1 are referred to by the same reference numerals. The position of the axes of the molecules are shown in FIG. 2 in proximity to the substrate electrode 11 in the absence of an electric signal which is to be supplied to the cell. These axes are oriented in the direction of the stripes such as, for example the stripe 22. In the case of a nematic liquid crystal which is dielectrically positive anisotropic and has a planar configuration with a helical nematic configuration corresponding to the configuration shown in FIG. 2, the axes are parallel to the conductive strips 14 and 13 adjacent to the strips and constitute the same angle, for example an angle of 20°, along the insulating strips, 15 or 23. When a signal is supplied, the oblique direction of the molecule axes adjacent to the insulating strips will induce a flipping-over movement in the same direction of the molecule axes adjacent to the conductive strips, not withstanding the oblique direction which the electric field has on either side of the median plane of each of the insulating strips and which is shown opposite to the strip 15 by the arrows 18 and 19. The flipping-over movement occurs in the direction of the arrow 9.

It will be obvious that the invention also relates a cell having a nematic liquid crystal has of negative dielectric anisotropy and a homeotropic configuration and for which the direction of the axes of the molecules in the boundary layer near each electrode is situated in a plane perpendicular to the electrode with the direction of the axes being perpendicular to the conductive strips in as far as the crystal parts are concerned which are situated adjacent to the strips and oblique with respect to the perpendicular direction, at an angle of a few degrees to a few tens of degrees in as far as the liquid crystal parts are concerned situated adjacent to the insulating strips.

The method of obtaining the correct orientation of the molecule axes at the level of the electrodes in the absence of an electric signal to be supplied to the cell depends on the configuration of the liquid crystal used. When the crystal has a planar configuration or a nematic helical configuration, the method according to the invention comprises a surface treatment of each electrode and its substrate. The surface treatment comprises two successive SiO depositions at different angles of incidence with respect to the substrate, in which the conductive parts of the electrodes are covered as a result of one of the depositions and the insulating parts are covered as a result of the other deposition. The thicknesses of layers thus provided are approximately a few tens of Ångstroms. The first deposition is carried out in a direction which constitutes a first plane of deposition with the normal to the substrate and which with the normal encloses an angle which is significantly smaller than 80° and which may be, for example, equal to 70°. The insulating strips are previously masked. It is known that in that case the axes of the molecules of the liquid crystal, in the proximity of conductive strip, are uniformly parallel to the plane of the strips. The second vapor deposition is carried out in a direction which constitutes a second plane of deposition with the normal to the substrate, and which is perpendicular to the first plane of deposition. The vapor direction constitutes with the normal to the substrate an angle which is considerably higher than 80°, for example, 85°. The conductive strips are previously masked. The axes of the molecules of the liquid crystal, as regards the molecules which are situated in the proximity of the insulating strips, then have the same inclination with respect to the substrate, and the axes are situated in planes which are both perpendicular to the substrate and parallel to the axes of the molecules near the conductive strips.

According to a modified embodiment of the method, the first vapor deposition is carried out on both the electrode and the substrate, the second vapor deposition is carried out after masking only the conductive strips.

According to another modified embodiment of the method, the sequence of the two vapor depositions is inverted. That is, first the vapor deposition with the angle of inclination of 85° is carried out after masking only the conductive strips, and second the vapor deposition with the angle of incidence of 70° is carried out on the whole electrode without previous masking.

What is claimed is:

1. A picture display device comprising
a liquid crystal cell including a layer of nematic liquid crystal between two sets of electrodes,
said liquid crystal having molecules in proximity to said electrodes with a predetermined orientation within parallel planes that are perpendicular to the plane of said electrodes, said orientation being variable under an electric field, and
intermediate spaces between portions of said electrodes at least at one side of said liquid crystal, said liquid crystal having molecules in proximity to said intermediate spaces being at an angle differing from the angle of said molecules in proximity to said electrodes by a difference ranging from a few degrees to a few tens of degrees.

2. A picture display device according to claim 1, wherein said nematic liquid crystal exhibits a negative dielectric anistropy and is homeotroptic, and wherein the axes of said liquid crystal molecules in a boundry layer at said electrodes are perpendicular to said electrode.

3. A picture display device according to claim 1, wherein said liquid crystal exhibits a positive dielectric anisotropy and is planar or helical, and wherein the axes of said liquid crystal molecules in a boundry layer at said electrodes is parallel to said electrodes.

4. A method of manufacturing a picture display device comprising
a liquid crystal cell including a layer of nematic liquid crystal between two sets of electrodes,
said liquid crystal having molecules in proximity to said electrodes with a predetermined orientation within parallel planes that are perpendicular to the plane of said electrodes, said orientation being variable under an electric field, and
intermediate spaces between portions of said electrodes at least at one side of said liquid crystal, said liquid crystal having molecules in proximity to said intermediate spaces being at an angle differing from the angle of said molecules in proximity to said electrodes by a difference ranging from a few degrees to a few tens of degrees, wherein said liquid crystal exhibits a positive dielectric anisotropy and is planar or helical, and wherein the axes of said liquid crystal molecules in a boundry layer at said electrodes is parallel to said electrodes,
said method comprising the steps of surface treating said electrodes and said intermediate spaces at each side of said liquid crystal, said surface treating including two successive SiO vapor depositions at different angles of incidence, one of said vapor depositions being carried out on said electrodes in a direction which is in a plane perpendicular to said electrodes and at an angle less than 80° with a normal to said electrodes, and the other of said vapor depositions being carried out on said intermediate spaces in a direction which is in a plane perpendicular to said intermediate spaces and perpendicular to said first plane of vapor deposition and at an angle greater than 80° with a normal to said intermediate spaces, said two vapor depositions depositing layer thicknesses of a few tens of angstroms.

5. A method according to claim 4, wherein said one vapor deposition is carried out first and said other vapor deposition is carried out second, and wherein said electrodes are masked during said second vapor deposition while said intermediate spaces may or may not be masked during said first vapor deposition.

6. A method according to claim 4, wherein said other vapor deposition is carried out first and said one vapor deposition is carried out second, and wherein said electrodes are masked during said first vapor deposition while said second vapor deposition is carried out on the whole electrode without previous masking.

7. A picture display device comprising
a liquid crystal cell including a layer of nematic liquid crystal between two sets of electrodes,
said liquid crystal having molecules in proximity to said electrodes with a predetermined orientation within parallel planes that are perpendicular to the plane of said electrodes, said orientation being variable under an electric field, and
intermediate spaces between portions of said electrodes at least at one side of said liquid crystal, said liquid crystal having molecules in proximity to said intermediate spaces being at an angle differing from the angle of said molecules in proximity to said electrodes by a difference ranging from a few degrees to a few tens of degrees, wherein said two sets of electrodes include a plurality of parallel conductive strips at each side of said liquid crystal, said conductive strips at one side of said liquid crystal being perpendicular in direction to said conductive strips at an opposite side of said liquid crystal.

8. A picture display device according to claim 1, wherein said intermediate spaces between said electrodes are insulating strips separating respective electrode portions at each side of said liquid crystal.

9. A picture display device according to claim 7, wherein said nematic liquid crystal exhibits a negative dielectric anisotropy and is homeotropic, and wherein the axes of said liquid crystal molecules in a boundary layer at said electrodes are perpendicular to said electrode.

10. A picture display device according to claim 7, wherein said liquid crystal exhibits a positive dielectric anisotropy and is planar or helical, and wherein the axes of said liquid crystal molecules in a boundry layer at said electrodes is parallel to said electrodes.

11. A picture display device according to claim 7, wherein said intermediate spaces between said electrodes are insulating strips separating respective electrode portions at each side of said liquid crystal.

* * * * *

UNITED STATES PATENT AND TRADEMARK OFFICE
CERTIFICATE OF CORRECTION

PATENT NO. : 4,496,220
DATED : January 29, 1985
INVENTOR(S) : Michel Goscianski

It is certified that error appears in the above—identified patent and that said Letters Patent is hereby corrected as shown below:

Colum 2, line 45, should read
--drawing or perpendicu- --

Signed and Sealed this

First Day of October 1985

[SEAL]

Attest:

DONALD J. QUIGG

Attesting Officer

Commissioner of Patents and
Trademarks—Designate